Figure 1:
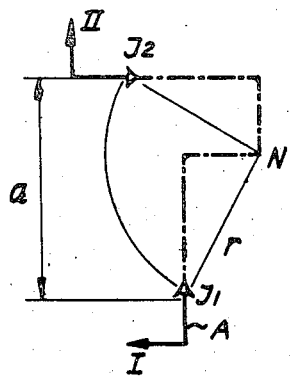

June 21, 1949.　　　E. VON SEGEBADEN　　2,474,133
MEANS FOR SUPPORTING OBSERVERS
IN RANGE-FINDER SYSTEMS
Filed Oct. 22, 1945　　　　　　　2 Sheets-Sheet 1

Inventor
Ernst von Segebaden
by Sommers & Young
Attorneys

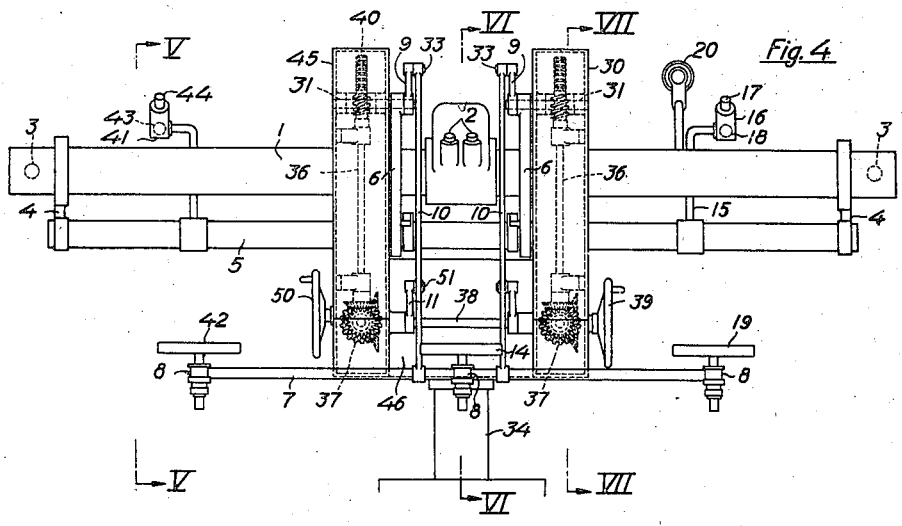
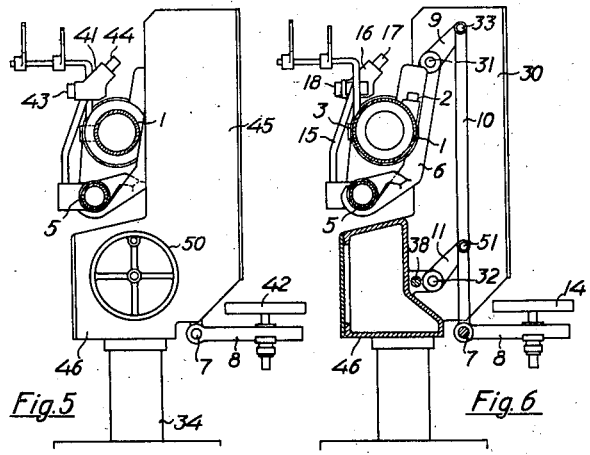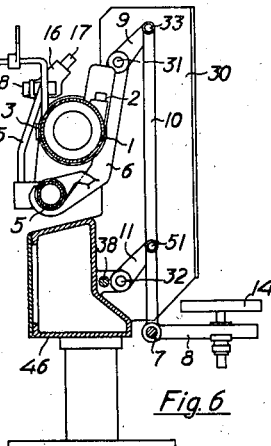
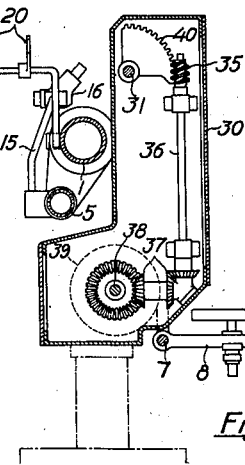

Patented June 21, 1949

2,474,133

UNITED STATES PATENT OFFICE 2,474,133

MEANS FOR SUPPORTING OBSERVERS IN RANGE-FINDER SYSTEMS

Ernst von Segebaden, Drottningholm, Sweden, assignor to Arenco Aktiebolag, Stockholm, Sweden, a joint-stock company of Sweden Application October 22, 1945, Serial No. 623,756
In Sweden November 2, 1944

8 Claims. (Cl. 88—1)

This invention relates to means for supporting optical instruments, such as sights or telescopes for observing and following aerial targets. A range finder constituting such an instrument has two objectives which are interconnected as well as connected to the eyepieces by a long horizontal tube. Such a range finder is also equipped with a sighting telescope for adjusting the range finder to the target in dependence of variations of the altitudinal angle of the latter. For constructional reasons the horizontal tube of the range finder as well as the sighting telescope are mounted on a horizontal bar which for adjustment in elevation may be swung round a horizontal axis by manual operation.

In order to enable a correct following of the target and range computing the observers' tasks have to be simplified as much as possible. Thereby two conditions are to be complied with. Thus, the heavy range finder as well as the heavy supporting bar should be easily swung up and down and, furthermore, the operators should be able to easily follow the movements of the eyepieces. In hitherto known arrangements the secondary condition is complied with thereby that the adjustment in elevation is performed by swinging round an axis passing through the neck hollow of the operator viewing straight into the eyepiece. Such an arrangement enables the observer to easily follow the swing of the eyepiece merely by bending his neck. Such an arrangement will, however, necessitate such a large turning radius that the primary condition cannot be complied with, unless a heavy counter-balance is used.

It is an object of the present invention to provide means for complying with both said conditions.

A further object of the invention consists in the provision of means for enabling the operator to easily follow the swing of the optical instruments even though the turning radius of the eyepiece is smaller than the distance between the eyes and the hollow of the neck of the observer.

Still another object of the invention consists in the provision of means for balancing the heavy instruments and their heavy support without the arrangement of any counterweight.

Further objects and advantages of the invention will become apparent in the following detailed description.

Figure 2:
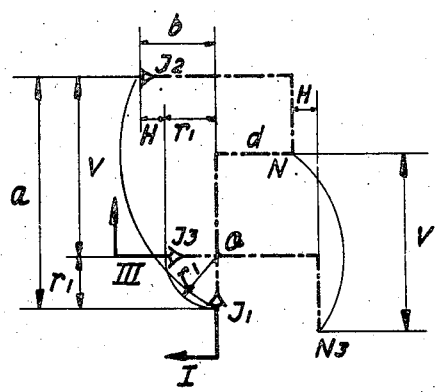
Figure 3:
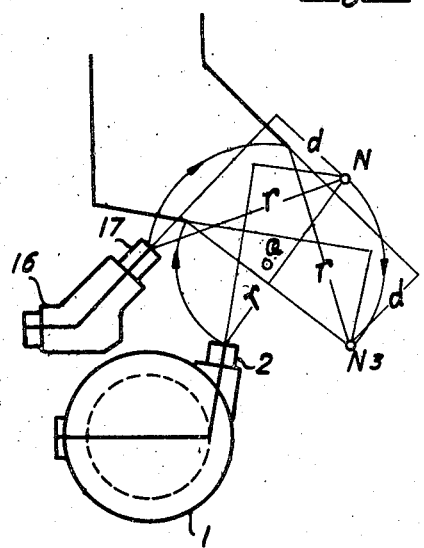

An arrangement according to the invention is illustrated by way of example in the accompanying drawings, in which like characters of reference indicate the same or corresponding parts and values:

Figs. 1 to 3 are explanatory diagrams;
Fig. 4 is a rear elevational view of a range finder embodying the invention; and
Figs. 5, 6 and 7 are sectional views on the lines V—V, VI—VI and VII—VII, respectively, of Fig. 4.

Referring to Fig. 1 of the drawings, it is assumed that a sighting telescope A is turned in the vertical plane round a horizontal axis N when following an aerial target the altitudinal angle of which is altered from 0° to 90° corresponding to the positions I and II, respectively, of the telescope. It is furthermore assumed that the angle between the optical axes of the eyepiece and the objective of said telescope is 90°.

Then the eyepiece of the telescope is swung round the axis N from the vertical position $I_1$ to the horizontal position $I_2$. The turning radius $r$ is assumed to be equal to the distance between the eyes and the hollow of the neck of an observer whose eyes are positioned close by the eyepiece. It is furthermore assumed that the observer bends his neck about the hollow of his neck when his eyes viewing straight into the eyepiece follow the swing of the telescope from the position I (horizontal sighting line) to the position II (vertical sighting line). Obviously, the observer can then easily follow the changes of position of the eyepiece, viz. merely by moving his head, whereby he raises his eyes as much as the eyepiece is raised, viz. by the distance $a$.

As mentioned hereinbefore it is, however, desirable to decrease the turning radius of the telescope as much as possible, but if the turning radius $r_1$ (Fig. 2) is smaller than $r$ the above-mentioned possibility of easy following by bending the observer's neck will be lost unless certain measures are taken. If the observer bends his neck (about the point N) in the manner described with reference to Fig. 1, and if the telescope turns through 90° about the horizontal axis O from the position I to the position III, the observer will raise his eyes as much as shown in Fig. 1 (to the position $I_2$), that is to say by the distance $a$, but the eyepiece will be raised by the distance $r_1$ only. Then if the observer has to view straight into the eyepiece he has to cower so that his head is lowered by an amount $$V = a - r_1$$

Obviously, the observer has to stretch himself correspondingly when the telescope is swung down. Even though the observer would be able to perform such motions they will gradually weary him, so that his capacity of observation will be lowered.

The present invention contemplates, however, provision for compensating the difference V thereby that the observer and thereby also the hollow of his neck is automatically displaced by an amount equal to said difference. Thus, in the example given with reference to Fig. 2, the observer is lowered by the amount V, so that the hollow of his neck is displaced from N to $N_3$, whereby his eyes will obtain the correct position, viz. at $I_3$.

When swinging about the axis O the eyepiece is, however, also displaced horizontally. According to Fig. 1, this displacement is equal to the horizontal displacement of the observer's eyes. When using the arrangement as shown in Fig. 2 the horizontal movement of the eyepiece and that of the observer's eyes will, however, be different. Thus, the observer's eyes are advanced by the distance $b$, whereas the horizontal displacement of the eyepiece is equal to $r_1$. The difference between the horizontal components of movement will thus be $$H = b - r_1$$

Also this difference will be compensated by provisions made according to the present invention inasmuch as the observer is displaced correspondingly along a curved path represented in Fig. 2 by the arc $NN_3$.

Obviously, the movements of the telescope and the observer's eyes in all directions will exactly correspond to the conditions as shown in Fig. 1 if the observer's position is altered so that the hollow of his neck is always at the point N, even though said point moves against $N_3$ as shown in Fig. 2. Thereby the observer has to be displaced in parallel. Otherwise, that is to say, if the observer sways his body, he would have to compensate such movements by bending his neck, so that an additional displacement of his eyes is obtained. Thus, the conditions of movement might be expressed thereby that the mechanical system that supports the optical instrument is turned round the point N relative to a mechanical system supporting the observer, whereby the optical instrument is so positioned relative to the point N that an observer maintaining the hollow of his neck at N is capable of correctly and easily viewing straight through the optical instrument. Assuming the observer has a normal bodily structure, said conditions presuppose a certain radius $r$ between the eyepiece, and its fulcrum as well as a certain distance $d$ between said fulcrum and the rear extension of the axis of the eyepiece.

If said conditions are fulfilled it will for easy and correct observation be immaterial whether the system supporting the optical instrument turns about the point O or any other point whatever when turning relative to a stationary frame. For the purpose of balancing it is, however, important that the fixed axis of rotation O has a suitable position between the centre of gravity of the system of optical instruments and the suspension point N of the observer's support.

The arrangement as shown in Figs. 4 to 7 is provided with an instrument for ascertaining the range of a movable aerial target, such as an airplane, the altitude of which is variable. Said range finder consists of a horizontal tube 1 having at its centre the eye pieces 2 and at its ends the objectives 3. The angles between the optical axes of the objectives 3 and the optical axes of the eyepieces exceeds slightly 90 degrees. The tube 1 is by means of two arms 4 secured to a horizontal bar 5, and said bar is secured to two lever arms 6 each of which is secured to a pin 31. The pins 31 are each rotatably journalled in a casing 30 and 45, respectively, and each carry a crank arm secured to them. To each crank arm 9 at a pin 33, is pivoted a link 10. The links 10 are interconnected at their bottom ends by a horizontal bar 7. To the rod 7 is secured a rearwardly directed rod 8 carrying a seat 14 for an observer positioned in front of the eyepieces 2. The seat 14 is adjustable vertically on the rod 8 as well as along same. To each link 10 is secured a pin 51, each pivotally connected to an arm 11. The arms 11 have the same lengths as the arms 9 and are each pivoted to a pin 32 secured to the casings 30 and 45, respectively, so that they are adapted to move in parallel relationship. Within each of the casings 30 and 45 is provided a worm wheel segment 40 secured to the pins 31 and meshing each with a worm 35 on a vertical rotatable shaft 36. The shafts 36 are by means of bevel gearings 37 connected to a common rotary shaft 38, to which is secured a hand wheel 39 for setting a telescope 16 for the altitudinal angle of the aerial target.

A standard 15 is secured to the bar 5 and carries the telescope 16 adjustable thereto vertically as well as horizontally. The eyepiece 17 of the telescope 16 is positioned slightly above the tube 1 and the optical axis of its objective 18 is at least substantially parallel to the optical axes of the objectives 3 of the range finder. In this arrangement the angle between the optical axis of the objective 18 and the optical axes of the eyepiece 17 of the telescope 16 is larger than 90°. Thus in the embodiment as illustrated said angle is substantially 135°. This development of the telescope 16 and its position are well adapted for obtaining a compact structure and, furthermore, for enabling the observer to alternately and easily serve this telescope and another sighting instrument, e. g. a straight sight or a diopter 20 (Figs. 4 and 7).

Still another hand wheel 50 is provided at the outside of the casing 45. By means of this hand wheel and a gearing (not shown), e. g. a worm secured to the spindle of the hand wheel 50 and a worm wheel secured to a frame 46 rotatably journalled on the standard 34, still another observer viewing through still another telescope 41 can follow the azimuthal rotation of the sighting line to the target. The telescope 41 is in the same manner as the telescope 16 adjustably mounted slightly above the tube 1 and has an eye piece 44 as well as an objective 43 the optical axis of which is parallel to the optical axis of the objective 18 of the telescope 16. The range finder as well as both the sighting telescopes 16 and 43 are adjusted in parallel, that is to say the optical axes of their objectives are adjusted at one and the same target.

The seats 19 and 42 for the observers viewing through the sighting telescopes 16 and 41 are also adjustable vertically as well as forwardly and rearwardly each on a rod 8 secured to the bar 7. If desired, the movements of the seats 19 and 42 may, however, be controlled by separate link systems similar to that carrying the seat 14.

The seats 14, 19 and 42 are so positioned and connected to the eyepieces of the respective optical instruments that the relative movements as illustrated in Fig. 3 are obtained. Thereby, said seats must not necessarily in each point of their paths of movement obtain positions for exactly compensating the differences between positions of eyepieces and eyes. The total amount of said differences should, however, not exceed an amount enabling the respective observers to easily compensate them by moving the hollows of their necks correspondingly. Such unimportant differences might arise when using the device as shown in Figs. 4 to 7 the operation of which is illustrated diagrammatically in Fig. 3. When the telescope 16 is rotated in elevation so that it follows the variations of the altitudinal angle of the target also the eyepieces 2 and 44 of the range finder and sighting telescope, respectively, follow said variations. The optical axes of the eyepieces 2 and 17 as well as the optical axis of the eyepiece 44 (not shown in Fig. 3) have such directions and positions relative to the common centre line of the pins 33 that said line is represented by the point N in Figs. 1, 2 and 3. If the seats 14, 19 and 42 are so adjusted that the hollows of the necks of the respective observers coincide with said centre line the condition mentioned hereinbefore as to easy and correct observation independently of the swing of the instruments will be fulfilled as the observers will by the movements of their seats maintain the hollows of their necks in the centre line of the pins 33 during the movement of the pins between the positions at N and N₃ on an arc having its centre 0 at the common centre of the pins 31 and having the radius $r_1$ equal to the effective length of the arms 9 and 11.

This report with reference to Fig. 3 is made under the presumption that all the observers have the same bodily structures. By the possibility of adjustment of the positions of the optical instruments as well as the observers' seats it will, however, be possible to obtain coincidence between the centre line of the pins 33 and the hollows of the necks of the observers, even though the observers have different bodily structures. As mentioned hereinbefore, it is, however, not necessary to exactly fulfil this condition as to coincidence if the differences are sufficiently small to enable the observers themselves to make corrections by other motions than by bending their necks. For the same reason it is not necessary that the distances $d$ are exactly equal for the different sighting instruments but they may be substantially equal. For the same reason the distances $r$ may be only substantially equal.

By the suspension arrangement as described, there is obtained not only automatic compensation of differences of positions but also balancing of the heavy parts swinging above the pins 31, viz. by the weights of the observers.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense. The sighting telescopes may be replaced by other sights and the angles between the optical axes of their eyepieces and objectives may be elected as desired. The telescopes 16 and 41 may be mounted below the tube 1 instead of above same. By the compensation of movements according to the invention the relative positioning of a plurality of sighting instruments can be varied within wide limits and without departing from the demand on easy and correct observation irrespective of the altitudinal angle of the object to be observed. Some of the seats for the observers or all the seats may be replaced by platforms for standing observers or supports for lying observers some of which or all of which may be displaceable in accordance with the invention. For obtaining the compensating movements in accordance with the invention other means than those described, e. g. guides, can be used, whereby the demand of full compensation of movements may to some extent be withdrawn.

I claim:

1. A range-finder system comprising a plurality of rigidly inter-connected sighting instruments swingable in elevation about a horizontal axis and each having an eye piece; a plurality of observers' supports each located below one of said eye pieces; and means for transmitting elevational swinging movements of said eye pieces into elevational movements of said supports, said transmitting means comprising a crank arm rigidly connected to said instruments, and a linkage having a rod pivotally suspended from said arm and carrying said plurality of supports, the distances of said eye pieces from an imaginary line parallel to said axis and passing through the center of the pivotal interconnection of said linkage and said crank arm being substantially equal, extensions of the optical axes of said eye pieces having different altitudinal, angular directions and being located at substantially equal distances from said imaginary line.

2. A range-finder system comprising a plurality of rigidly interconnected sighting instruments swingable in elevation about a horizontal axis and each having an eye piece; a plurality of observers' supports each located below one of said eye pieces; and means for transmitting elevational swinging movements of said eye pieces into elevational movements of said supports, said transmitting means comprising a crank arm rigidly connected to said instruments, and a linkage having a rod pivotally suspended from said arm and carrying said plurality of supports, the distances of said eye pieces from an imaginary line parallel to said axis and passing through the center of the pivotal interconnection of said linkage and said crank arm being substantially equal and being greater than the distances between said eye pieces and said horizontal axis, extensions of the optical axes of said eye pieces having different altitudinal, angular directions and being located at substantial equal distances from said imaginary line.

3. A range-finder system comprising a plurality of rigidly interconnected sighting instruments swingable in elevation about a horizontal axis and each having an eye piece and a view piece; a plurality of observers' supports each located below one of said eye pieces; and means for transmitting elevational swinging movements of said eye pieces into elevational movements of said supports, said transmitting means comprising a crank arm rigidly connected to said instruments, and a linkage having a rod pivotally suspended from said arm and carrying said plurality of supports, said eye pieces being located between said view pieces and an imaginary line parallel to said axis and passing through the center of the pivotal interconnection of said linkage and said crank arm, the distances of said eye pieces from said imaginary line being substantially equal, extensions of the optical axes of said eye pieces having different altitudinal, angular directions and being located at substantially equal distances from said imaginary line.

4. A range-finder system comprising a plurality of rigidly interconnected sighting instruments swingable in elevation about a horizontal axis and each having an eye piece and a view piece; a plurality of observer's supports each located below one of said eye pieces; and means for transmitting elevational swinging movements of said eye pieces into elevational movements of said supports, said transmitting means comprising a crank arm rigidly connected to said instruments, and a linkage having a rod pivotally suspended from said arm and carrying said plurality of supports, said eye pieces being located between said view pieces and an imaginary line parallel to said axis and passing through the center of the pivotal interconnection of said linkage and said crank arm, and below the optical axes of said eye pieces being located above said imaginary line, the distances of said eye pieces from said imaginary line being substantially equal, extensions of the optical axes of said eye pieces having different altitudinal, angular directions and being located at substantially equal distances from said imaginary line.

5. A range-finder system comprising a plurality of rigidly interconnected sighting instruments swingable in elevation about a horizontal axis and each having an eye piece and a view piece; a plurality of observers' supports each located below one of said eye pieces; and means for transmitting elevational swinging movements of said eye pieces into elevational movements of said supports, said transmitting means comprising a crank arm rigidly connected to said instruments, and a linkage having a rod pivotally suspended from said arm and carrying said plurality of supports, said eye pieces being located between said view pieces and an imaginary line parallel to said axis and passing through the center of the pivotal interconnection of said linkage and said crank arm the optical axes of said eye pieces being located at distances from said imaginary line that are smaller than the projections on said optical axes of the distances between said eye pieces and said imaginary line, the distances of said eye pieces from said imaginary line being substantially equal, extensions of the optical axes of said eye pieces having different altitudinal, angular directions and being located at substantially equal distances from said imaginary line.

6. A range-finder system comprising a plurality of rigidly interconnected sighting instruments swingable in elevation about a horizontal axis and each having an eye piece; a plurality of observers' supports each located below one of said eye pieces; and means for transmitting elevational swinging movements of said eye pieces into elevational movements of said supports, said transmitting means comprising a crank arm rigidly connected to said instruments, and a linkage having a rod pivotally suspended from said arm and carrying said plurality of supports, the distances of said eye pieces from an imaginary line parallel to said axis and passing through the center of the pivotal interconnection of said linkage and said crank arm being substantially equal to each other and to the distance between the eyes and the neck hollow of an observer having a normal bodily structure, extensions of the optical axes of said eye pieces having different altitudinal, angular directions and being located at distances from said imaginary line that are substantially equal and correspond to the vertical component of the distance between the eyes and the neck hollow of an observer having a normal bodily structure and looking horizontally and straight ahead.

7. A range-finder system comprising a horizontal tubular range-finder and a directional sighting instrument rigidly connected to said range finder in an offset relation thereto and being rotatable in elevation together with said range-finder about a horizontal axis parallel to said range finder tube, said range finder and said sighting instrument each having an eye piece; two observers' supports each located below one of said eye pieces; and means for transmitting elevational swinging movements of said eye pieces into elevational movements of said supports, said transmitting means comprising a crank arm rigidly connected to said range-finder, and a linkage having a rod pivotally suspended from said arm and carrying said plurality of supports, the distances of said eye pieces from an imaginary line parallel to said axis and passing through the center of the pivotal interconnection of said linkage and said crank arm being substantially equal, extensions of the optical axes of said eye pieces having different altitudinal, angular directions and being located at substantially equal distances from said imaginary line.

8. A range-finder system comprising a horizontal tubular range finder and a directional sighting instrument rigidly connected to said range finder in an offset relation thereto and being rotatable in elevation together with said range finder about a horizontal axis parallel to said range finder tube, said range finder and said sighting instrument each having an eye piece and a view piece; two observers' supports each located below one of said eye pieces; and means for transmitting elevational swinging movements of said eye pieces into elevational movements of said supports, said transmitting means comprising a crank arm rigidly connected to said range finder, and a linkage having a rod pivotally suspended from said arm and carrying said plurality of supports, said eye pieces being located between said view pieces and an imaginary line parallel to said axis and passing through the center of the pivotal interconnection of said linkage and said crank arm, the distances of said eye pieces from said imaginary line being substantially equal, extensions of the optical axes of said eye pieces being located at substantially equal distances from said imaginary line, said eye pieces having different altitudinal angular directions.

ERNST von SEGEBADEN.

REFERENCES CITED

The following references are of record in the file of this patent:

UNITED STATES PATENTS

| Number | Name | Date |
| --- | --- | --- |
| 1,673,320 | French | June 12, 1928 |
| 1,724,093 | Kauch et al. | Aug. 13, 1929 |
| 1,974,864 | Fletcher | Sept. 25, 1934 |
| 2,335,286 | Klemperer et al. | Nov. 30, 1943 |

FOREIGN PATENTS

| Number | Country | Date |
| --- | --- | --- |
| 662,794 | France | Mar. 25, 1929 |
| 541,990 | Great Britain | Dec. 22, 1941 |